United States Patent [19]
McNeil et al.

[11] 3,800,079
[45] Mar. 26, 1974

[54] COMPENSATION FOR A SCANNING SYSTEM

[75] Inventors: William D. McNeil; William S. Rohland, both of Rochester, Minn.

[73] Assignee: International Business Machines Corporation, Armonk, N.Y.

[22] Filed: Dec. 18, 1972

[21] Appl. No.: 316,337

[52] U.S. Cl. .................... 178/7.1
[51] Int. Cl. .................... H04n 5/30
[58] Field of Search .................... 178/7.5 R, 7.3 D, 7.1

[56] References Cited

UNITED STATES PATENTS

| | | | |
|---|---|---|---|
| 2,989,585 | 6/1961 | Schroter | 178/7.5 R |
| 3,536,830 | 10/1970 | Hakki | 178/7.3 D |

*Primary Examiner*—Richard Murray
*Attorney, Agent, or Firm*—Donald F. Voss

[57] ABSTRACT

A sensitivity profile of photodiodes forming a self-scanned photodiode array operating in the charge storage mode is obtained as the array scans a standard background or white level while in a non-operational or write mode. The serial output of the photodiode array is integrated and a predetermined grey level is subtracted to limit the resultant signal to the range affected by photodiode sensitivity variations and illumination non-uniformities. The resultant signal is digitized and stored under control of a write control signal. Compensation then takes place in an operational mode. The stored digital signals are converted to an analog signal and the grey level is added thereto. This resultant signal is then applied as a compensation signal to a differential amplifier and to a divider circuit. The serial uncorrected video information signal from the integrator is also applied to the differential amplifier whose output is applied to the divider circuit where the photodiode sensitivity and illumination variations are removed to provide a corrected video information signal.

11 Claims, 3 Drawing Figures

COMPENSATION FOR A SCANNING SYSTEM

BACKGROUND OF THE INVENTION

1. Field of the Invention

This invention relates to improved circuitry for providing compensation for photodiode sensitivity and illumination variances in a self-scanned photodiode array scanning system and more particularly to such circuitry where the sensitivity and illumination variances are collected and stored during a non-operational mode and then used to correct the serial video information during an operating mode.

The invention is particularly useful in information collection systems where a self-scanned photodiode array is used to scan large areas or entire documents. The video information generated by the photodiode array is then further processed by information recognition or reproduction systems. The performance of the recognition or reproduction systems, among other parameters, is dependent upon the validity of the video information. The video information amplitude errors due to photodiode sensitivity and illumination variances can be greater than ± 8 percent, and as such, are intolerable. A high performance recognition or reproduction system requires that compensation be provided for the video information generated by the self-scanned photodiode array.

2. Description of the Prior Art

Other known prior art techniques for providing dynamic compensation for photodiode sensitivity variances do not compensate as well for illumination variances and require relatively accurate analog circuitry for the entire compensation system. The present invention is an improvement in that it provides compensation for both photodiode sensitivity and illumination variances and uses less expensive digital circuitry for some portions of the compensation system. The principle of the invention is entirely different from the other prior art compensation systems in that it first collects and stores a compensation profile of the scan system. Then while in an operating mode, the stored compensation signal is retrieved and dynamically applied to a correction circuit in synchronism with the application of the uncompensated serial video information signal. One known prior art dynamic compensation system uses an additional light source for generating the compensation signal at the same time that the uncompensated video information signal is being generated. The two signals are separated and then applied to the correction circuit. It is thus seen that the principles of operation are quite different. Further, in the present invention, the compensation profile can be updated periodically to correct for any drift in photodiode sensitivity and illumination variances. Changes in illumination variances come from aging or replacement of the light source.

SUMMARY

The principal objects of the invention are to provide an improved compensation circuit for a scanning system including a light source and self-scanned photodiode array which: (a) compensates for both photodiode sensitivity and illumination variances, (b) provides accurate compensation, (c) is relatively low cost, and (d) can compensate for drift in photodiode sensitivity and illumination variances.

The foregoing objects are achieved by collecting a sensitivity profile of the photodiodes forming the self-scanned photodiode array during a non-operational or write mode. The sensitivity profile is stored in digital form and then during the operational mode, it is converted from digital to analog form and used to correct the video information signal so as to compensate for differences in photodiode sensitivities and illumination variances.

DESCRIPTION

Figure 1:
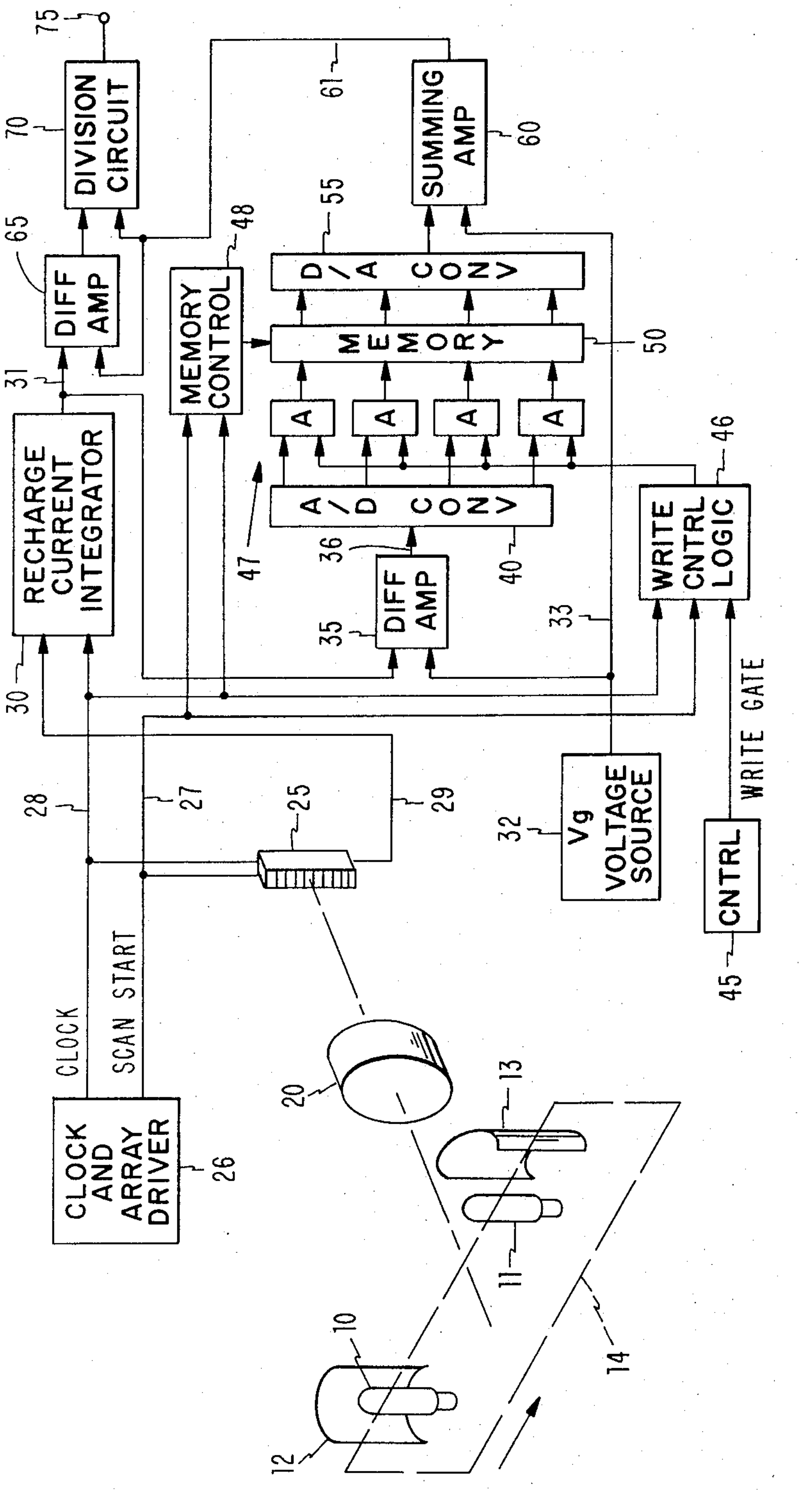
FIG. 1 is a schematic block diagram illustrating the invention.

With reference to the drawings, and particularly to FIG. 1, the invention is illustrated by way of example where the scanning system includes light sources 10 and 11 and associated reflectors 12 and 13 for flooding document 14 with light as it moves relative thereto. Light reflected from document 14 is collected and imaged by lens 20 unto photodiode array 25. The particular light sources, optics and system for moving the document relative thereto are not significant so far as the present invention is concerned and therefore only a representative system is shown. Also, the document could be stationary as the array 25 is moved to scan it.

Photodiode array 25 is a self-scanned array which is commercially available. Self-scanned photodiode arrays include a clock and a driver circuit as represented by block 26. A clock and array driver circuit 26 provides a start pulse to array 25 over conductor 27 and clock pulses on conductor 28. The clock may be either externally driven or free-running. Its repetition rate is set equal to the desired scan or bit rate. The scan is initiated by the start pulse which is coincident with a clock pulse. The serial output from photodiode array 25 appears on conductor 29. It should be noted that an external amplifier, none shown, could be used, or the amplifier could be integrated with the photodiode array.

The photodiodes of the self-scanned array 25 operate in the charge storing mode. The charge storage mode operates in a fashion that as the array is scanned, each diode is being sequentially accessed and charged through a common video line to a standard voltage. During the scan period, the diodes are discharged by the photo current generated by incident light. The charge required to restore each diode in sequence to the standard voltage is the video output signal.

The sensitivity profile is collected during a write mode as array 25 scans a standard background or white level which may be in the form of a document or a bedplate. The serial output of photodiode array 25 as it is scanning the standard background or white level is shown as waveform A in FIG. 2. The differences in the charges required to restore the diodes to the standard voltage is due to non-uniformity in sensitivity and in illumination. These variations are seen as levels appearing at the output of integrator 30 which integrates the serial video signal from photodiode array 25 under control of clock signals from clock and array driver 26.

The sensitivity profile as represented by waveform B is digitized. However, in order to utilize the resolution of A/D converter 40, only that portion of the signal affected by photodiode sensitivity and illumination variation is digitized. This portion of the signal is isolated by applying the output of integrator 30 over conductor 31 to differential amplifier 35. A fixed grey level $Vg$ from voltage source 32 is also applied to differential amplifier 35 over conductor 33. Differential amplifier 35 substracts the fixed grey level $Vg$ from the integrator output signal. The signal from integrator 30 during the write mode is a signal $Vjw$ from the white surface of reflectance $Rw$ where $j$ refers to the $j$th photodiode and $w$ refers to the white surface of reflectance.

Figure 2:
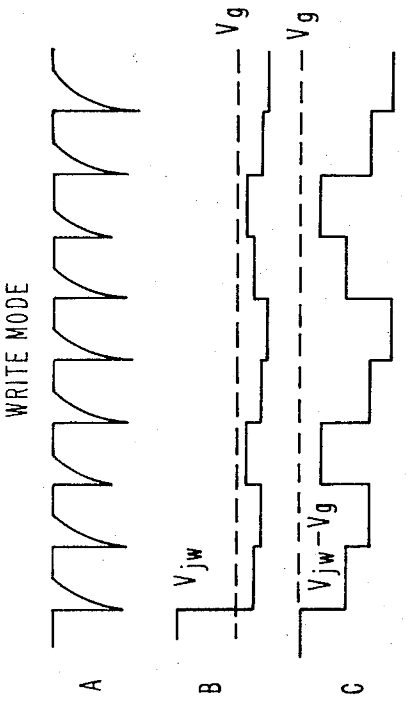
FIG. 2 is a waveform diagram showing the signals during a write mode.

The output of differential amplifier 35 is applied to A/D converter 40 via conductor 36 and appears as waveform C in FIG. 2. In this example, A/D converter 40 digitizes the signal from differential amplifier 35 into four binary bit levels. The value of the difference, as represented by the four bits, represents the non-uniformity profile. The digital information appearing at the output of A/D converter 40 is entered into memory 50 via logical AND circuits 47 under control of signals from write control logic 46 and memory control 48. Write control logic 46 receives a Write gate signal from control 45 and Scan Start and Clock signals from clock and array driver 26. The digital data passed by AND circuits 47 are entered into memory 50 under control of memory control 48. Memory control 48 synchronizes the read in and read out of data from memory 50 with the scanning of photodiode array 25. Thus, memory control 48 receives Clock and Scan Start signals from clock and array driver 26.

The digital outputs from memory 50 are applied to D/A converter 55. The output of D/A converter 55 is an analog signal which is applied to summing amplifier 60 together with the fixed grey level Vg from voltage source 32. The output of summing amplifier 60 reproduces the waveform B of FIG. 2 and is applied via conductor 61 to differential amplifier 65 and to division circuit 70. The output of differential amplifier 65 is also applied to division circuit 70. It should be noted that the logic elements just described are conventional elements and further description thereof is not deemed to be necessary. Memory 50, for example, can take many forms and could be a shift register where read in and read out is controlled by memory control 48. Division circuit 70 is also the type well-known in the art, however, it is preferably of the type shown and described in U.S. Pat. No. 3,626,092 dated Dec. 7, 1971 for Video Amplifier for Optical Scanner. The division is performed by first converting the signals to logarithmetic form and then subtracting the logarithmethic representations by means of a differential amplifier.

While in the write mode, digital data is being read out from memory 50 to D/A converter 55. The signal from D/A converter 55 is applied to summing amplifier 60 and its output is the same signal as represented by waveform B of FIG. 2. This signal is applied to differential amplifier 65 and to division circuit 70. Differential amplifier 65 subtracts the signals from integrator 30 and summing amplifier 60. When in the write mode, these signals are the same. However, as it will be seen shortly, compensation takes place when in the operating mode. It should be noted that when in the operating mode, no digital data is entered into memory 50, but the compensation data is continuously read out of memory 50 in synchronism with the scanning of photodiode array 25.

Figure 3:
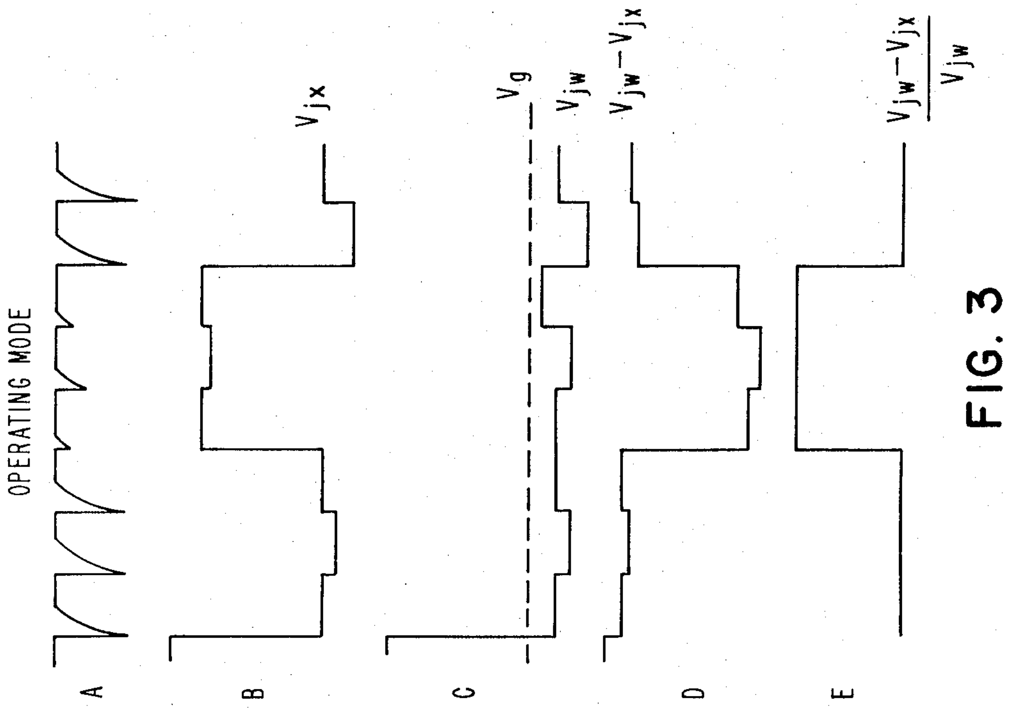
FIG. 3 is a waveform diagram showing the signals during the operating mode.

The outputs of the photodiode array 25 and integrator 30 when in the operating mode are represented by waveforms A and B of FIG. 3, respectively. The signal level for each photodiode depends upon the charge required to restore it to the standard voltage. Thus, the output of integrator 30 is the uncompensated serial video information signal $Vjx$ from scanning an area having a reflectance $Rx$ and a contrast $Cx$ anywhere between white and black where $j$ refers to the $j$th photodiode and $x$ represents the operating mode. During the operating mode, write control logic 46 does not provide a signal for conditioning AND circuits 47. Thus, although the uncompensated video information signal is applied to differential amplifier 35 and its output is converted by A/D converter 40, the digital information therefrom is not entered into memory 50. However, the digital data read out from memory 50 under control of memory control 48 is converted to an analog signal by D/A converter 55. The summing amplifier 60 provides the signal as represented by waveform C in FIG. 3. This is the sensitivity compensation signal which is applied to differential amplifier 65 and is the same as the signal represented by waveform B of FIG. 2. The output of differential amplifier 65 while in the operating mode is represented by waveform D of FIG. 3 and equals $Vjw-Vjx$. This output is then divided by the output $Vjw$ from summing amplifier 60. The division is performed by division circuit 70 and the output of division circuit 70 is the compensated serial video information signal appearing at output terminal 75 as represented by waveform E in FIG. 3. This compensated serial video information signal is an analog signal and is then sent to a utilization system not shown. The utilization system including a threshold circuit for quantization of the video contrast signal to black/white or multiple grey levels, can be a recognition, reproduction or processing system and its form is not pertinent to this invention.

From the foregoing, it is seen that while in a write mode, the serial video information from photodiode array 25 is used to form a compensation signal which is stored in digital form. This compensation signal is then retrieved from storage whereby during an operating mode, it compensates for photodiode sensitivity and illumination variances in the uncorrected serial video information signal. The sensitivity factor is removed by dividing out the sensitivities. The signal level $Vjx$ equals $kSjRx$ where $Sj$ is the sensitivity of the $j$th photodiode and $k$ is a constant of proportionality. Similarly, the signal level $Vjw$ equals $kSjRw$ where $Sj$ is the sensitivity of the $j$th photodiode and $k$ is a constant of proportionality. Contrast $Cx = (Vjw-Vjx)/Vjw = (kSjRw-kSjRx)/kSjRw = (Rw-Rx)/Rw$. The foregoing assumes that the total black levels from the array are negligibly affected by photodiode leakage. It should be noted that the embodiment of the invention could be extended to compensate for leakage current non-uniformity by modifying the contrast expression to: $Cx = (Rw-Rx)/(Rw-Rb)$. In this instance, there would be a second write mode during which photodiode array 25 would scan a black level and a non-uniformity profile would be stored for black as well as for white. It should be further noted that an analog shift register could be used in place of memory 50 and converters 40 and 55.

What is claimed is:

1. A sensitivity compensation circuit for a self-scanned photodiode array having a serial video information output comprising:

generating means for generating a photodiode sensitivity profile signal for the photodiodes in said array, storage means for storing said sensitivity profile signal during a predetermined mode of operation of said photodiode array, means for entering said sensitivity profile signal into said storage means, means for retrieving said sensitivity profile signal from said storage means as said photodiode array produces a serial video information output, and corrections means responsive to said sensitivity profile signal retrieved from said storage means and said serial video information output for generating a corrected serial video information signal.

2. The sensitivity compensation circuit of claim 1 wherein said generating means comprises an integrator for generating a signal by integrating said serial video information output of said photodiode array as said photodiode array scans a standard reflectance level, and means for digitizing said signal generated by said integrator.

3. The sensitivity compensation circuit of claim 2 wherein said generating means further comprises means for subtracting a predetermined signal level from said signal generated by said integrator.

4. The sensitivity compensation circuit of claim 1 wherein said means for entering said sensitivity profile into said storage means is selectively operable.

5. The sensitivity compensation circuit of claim 4 wherein said means for selectively entering said sensitivity profile into said storage means comprises a plurality of AND circuits connected between said means for digitizing said signal generated by said integrator and said storage means, and means for selectively conditioning said AND circuits.

6. The sensitivity compensation circuit of claim 1 wherein said storage means is digital.

7. The sensitivity compensation circuit of claim 1 wherein said correction means comprises subtraction means for subtracting said uncorrected serial video information output from said sensitivity profile signal, and dividing means for dividing the output of said subtraction means by said sensitivity profile signal.

8. The sensitivity compensation circuit of claim 7 wherein said subtraction means is a differential amplifier.

9. The sensitivity compensation circuit of claim 1 wherein said storage means is an alterable storage means.

10. The sensitivity compensation circuit of claim 9 further comprising means for dynamically updating the contents of said alterable storage means.

11. The sensitivity compensation circuit of claim 1 wherein said generating means periodically generates a photodiode sensitivity profile signal for the photodiodes in said array during a predetermined mode of operation of said photodiode array.

* * * * *